United States Patent [19]

Breveglierij et al.

[11] Patent Number: 4,869,518
[45] Date of Patent: Sep. 26, 1989

[54] UTILITY CART

[75] Inventors: Frank J. Breveglierij, Spring Lake, Mich.; Kenneth F. Streit, Mt. Prospect, Ill.

[73] Assignee: Geerpres, Inc., Muskegon, Mich.

[21] Appl. No.: 216,619

[22] Filed: Jul. 8, 1988

Related U.S. Application Data

[63] Continuation-in-part of Ser. No. 15,950, Feb. 18, 1987, which is a continuation-in-part of Ser. No. 912,567, Sep. 29, 1986, Pat. No. 4,743,040.

[51] Int. Cl.⁴ .............................................. B62B 3/02
[52] U.S. Cl. .................................... 280/47.35; 248/98
[58] Field of Search ........... 280/47.34, 47.35, 79.1 A, 280/79.2, 47.26, 47.28; 403/167, 168; 108/111; 312/265; 211/189; 248/98, 129

[56] References Cited

U.S. PATENT DOCUMENTS

| D. 115,352 | 6/1939 | Scudder | 280/47.35 |
|---|---|---|---|
| 1,097,163 | 5/1914 | Brown | 280/47.35 |
| 2,158,641 | 5/1939 | Stenberg | 312/265 |
| 2,311,422 | 2/1943 | Walling | 280/50 |
| 2,424,644 | 7/1947 | Barrett | 280/50 |
| 2,583,196 | 1/1952 | Zander et al. | 280/47.35 |
| 2,596,749 | 5/1952 | Webber | 211/1 |
| 2,833,550 | 5/1958 | Frick | 280/47.34 |
| 3,102,648 | 9/1963 | Hughes | 214/375 |
| 3,145,031 | 8/1964 | Wilkinson | 280/47.35 |
| 3,874,531 | 4/1975 | Mayo | 280/47.35 |
| 3,894,748 | 7/1975 | Ratcliff | 280/47.35 |
| 4,119,044 | 10/1978 | Hines | 108/27 |
| 4,179,132 | 12/1979 | Rich | 248/98 |
| 4,222,145 | 9/1980 | Lowder | 280/47.26 |
| 4,237,798 | 12/1980 | Welsh et al. | 108/111 |
| 4,281,843 | 8/1981 | Johnson et al. | 280/47.26 |
| 4,350,366 | 9/1982 | Helms | 280/655 |
| 4,355,818 | 10/1982 | Watts | 280/654 |
| 4,497,524 | 2/1985 | Levings, Jr. et al. | 312/265 |
| 4,743,040 | 5/1988 | Breveglieri et al. | 780/47.35 |

Primary Examiner—Charles A. Marmor
Assistant Examiner—Richard Camby
Attorney, Agent, or Firm—Harness, Dickey & Pierce

[57] ABSTRACT

A utility cart having a mechanism to retain plastic bags or the like is disclosed. The mechanism includes a first U-shaped member in a horizontal plane adapted to receive plastic bags or the like. A second member interlocks the plastic bag or the like on the first member to enable trash to be deposited into the secured plastic bag.

6 Claims, 4 Drawing Sheets

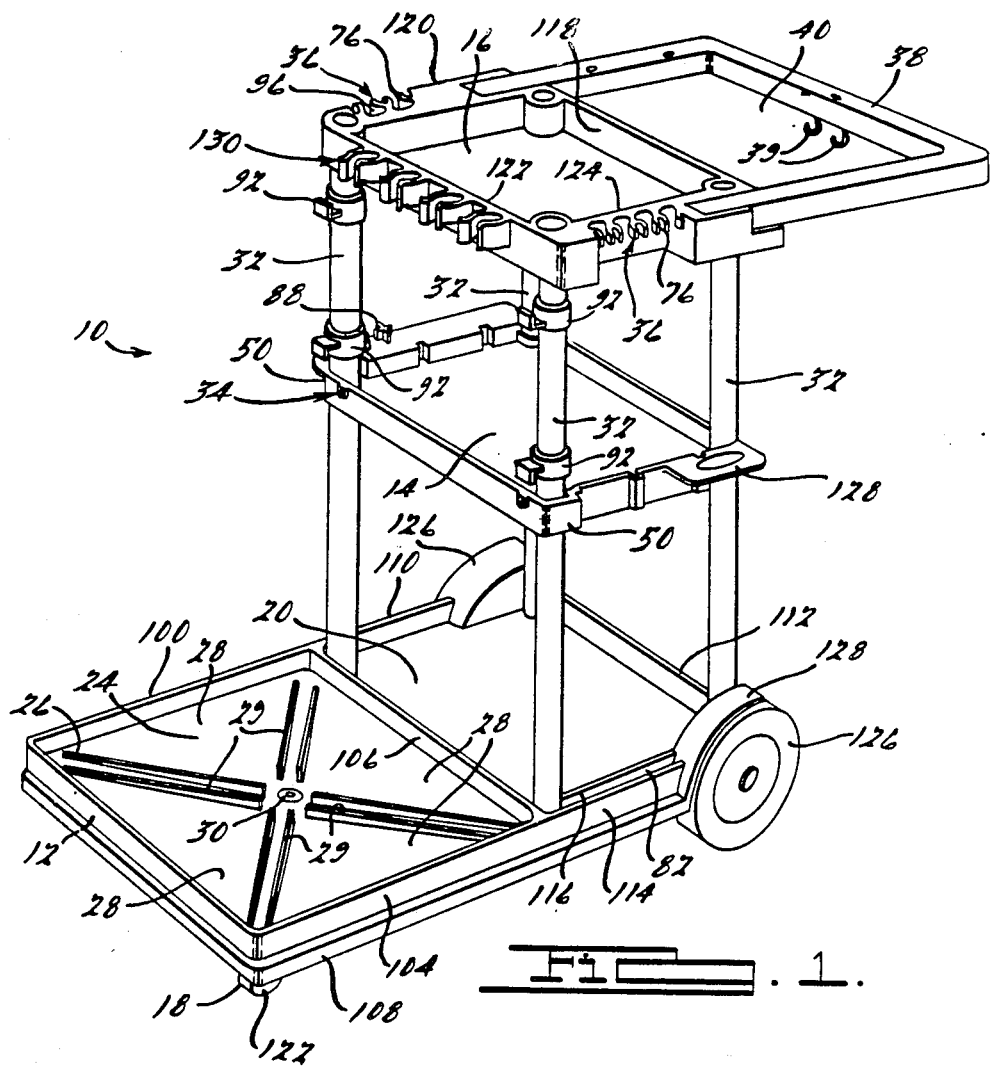
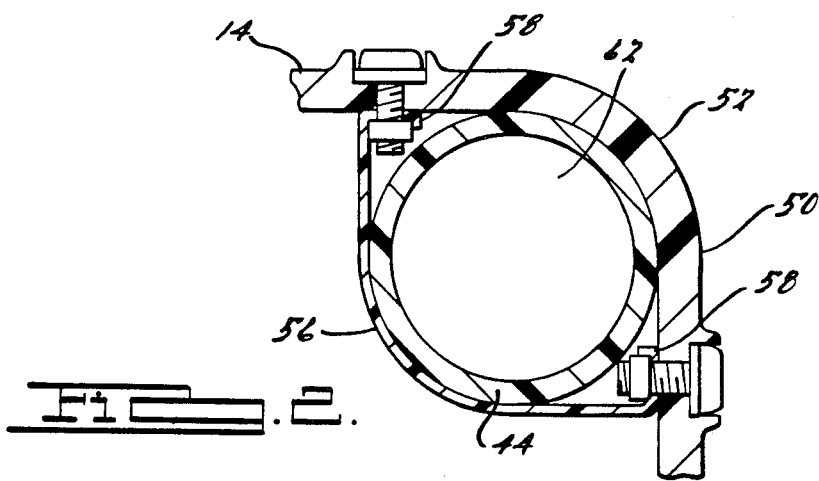

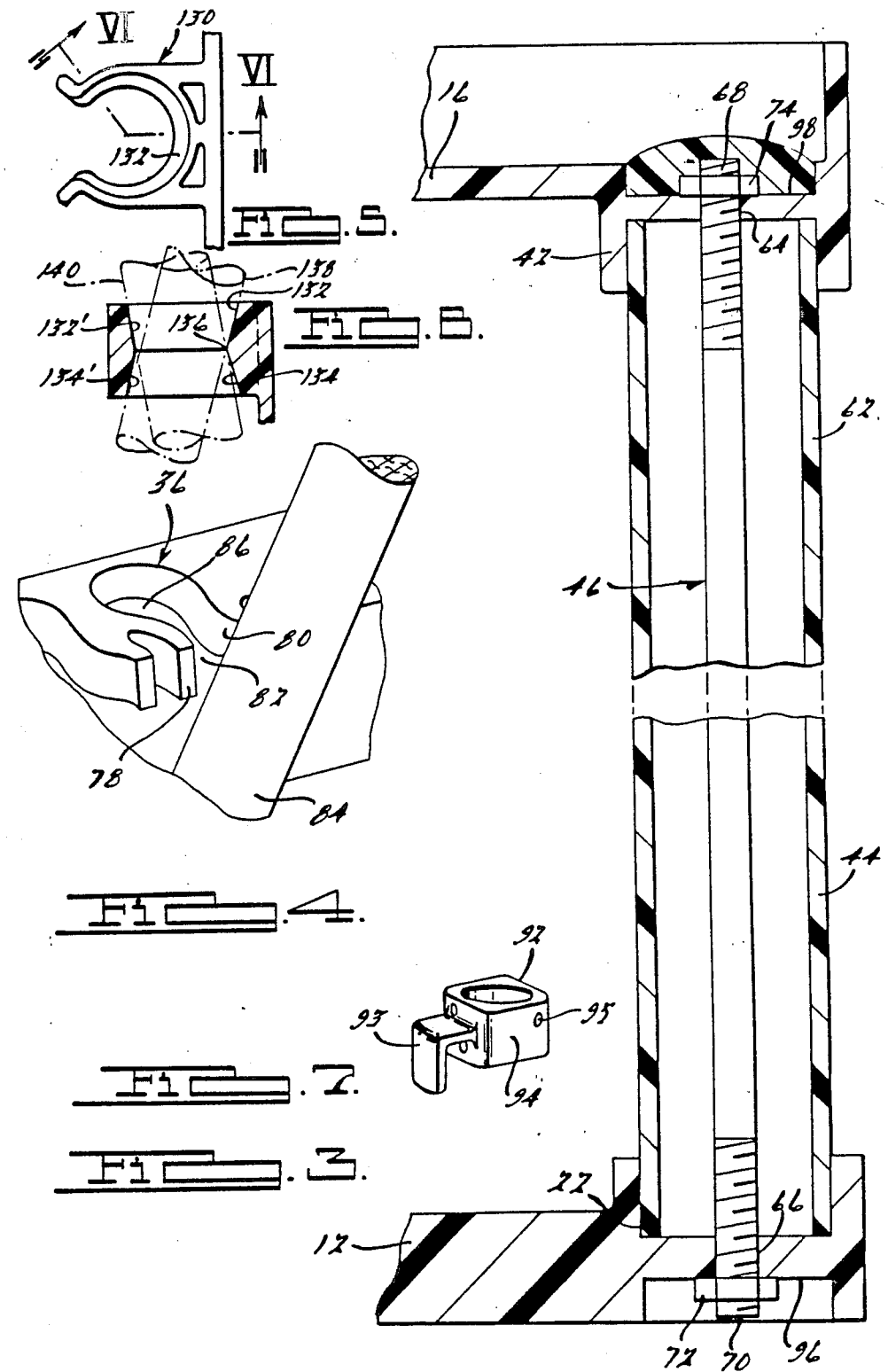

UTILITY CART

REFERENCE TO RELATED APPLICATIONS

This application is a continuation-in-part of copending application Ser. No. 015,950 filed Feb. 18, 1987 which, in turn is a continuation-in-part of application Ser. No. 912,567 filed Sep. 29, 1986 Pat. No. 4,743,040 the specifications of which are herein expressly incorporated by reference.

TECHNICAL FIELD

The subject invention relates to a movable cart for the transport of cleaning utensils. More specifically, the present invention is a wheeled utility cart for use by a cleaning person wherein the cleaning person can efficiently carry all the necessary implements for normal cleaning duties.

BACKGROUND ART

It has been the goal of relevant art devices to produce a utility cart which efficiently and conveniently will hold in a readily accessible position all implements or tools required in a janitorial or cleaning person's job. However, because of the varying natures in the janitorial or cleaning job environment, the cart must be flexible enough to be readily adapted to a particular job environment. In addition, the utility cart must be of durable construction which is impervious to harsh and caustic chemicals generally used in cleaning operations.

Relevant art devices have generally met the durability requirement for a utility cart by constructing the apparatus out of heavy duty steel members. The members are generally welded or clamped together. Some examples of these relevant art devices include H. J. Barnett, U.S. Pat. No. 2,424,644; Webber, U.S. Pat. No. 2,596,749; Walling, U.S. Pat. No. 2,311,422; and Scudder, U.S. Pat. No. D-115,352; and Mayo, U.S. Pat. No. 3,874,531. The increased weight, because of the use of steel in these utility carts, requires a heavy duty axle and wheel assembly, substantially increasing the cost of the unit, or may even require a motorized vehicle to transport the cart as taught by Mayo, U.S. Pat. No. 3,874,531. In addition, the use of these heavy materials creates unnecessary fatigue on the cleaning personnel who are the ultimate users of these carts due to the extra effort required to push the heavy utility cart around. A further disadvantage of the use of steel construction is that it readily yields to the corrosive properties of cleaning materials which will inevitably get spilled or otherwise come into contact with the parts of the utility carts. In addition, steel is not waterproof and easily corrodes when exposed to the elements increasing the necessary maintenance such as painting and other types of protection of the cart.

In addition, the relevant art devices either do not efficiently use cart space, or in the alternative do not provide sufficient cart space for all of the required cleaning utensils. These devices also are inflexible and cannot be customized to the particular needs of a final user.

STATEMENT OF THE INVENTION

According to the present invention, there is provided a manually propelled utility cart comprising a base means, a top tray means, and an intermediate tray means. The base means includes a wheeled movement means for multidirectional horizontal movement of the utility cart along a floor surface. The base means also includes a utility tray means, a lower support post engaging means, and a mop bucket carrying means.

A vertical structural support means is provided for supporting the intermediate tray means and the top tray means in a vertically upward position from the base means. The intermediate tray means has adjustable positioning means and is also in slideable engagement with the vertical structural support means. The top tray means has an upper support post engaging means. The vertical structural support means includes at least one hollow rod structural member which is engaged and secured in compression between lower support post engagement means and the upper support post engaging means by a compression means. The adjustable positioning means includes releasable clamping means for releasably clamping the intermediate tray means in variable vertical positions between the utility tray means and the top tray means.

In an alternate embodiment the adjustable positioning means includes a throughbore means and a counterbore means defining a shoulder portion. Peripheral grooves are provided in the structural member. An expandable ring means is provided for positioning in the groove. The throughbore means is slideable over the structural support member. The counterbore means is slideable over the expandable ring means for holding the ring in the groove. The shoulder portion rests on the expandable ring means for preventing movement of the intermediate tray means beyond a predetermined position.

Another embodiment illustrates means for retaining a bag or the like. The retaining means is pivotal from a first position where a bag is positioned on or removed from the cart to a second position where the bag is secured to the cart.

It is an object of the present invention to construct a utility cart which solves the problems of the prior art devices.

More particularly, it is an object of the present invention to provide a utility cart of a simplified lightweight and durable construction which is impervious to caustic chemicals and fluids used by cleaning personnel.

It is a further object of the present invention to provide a utility cart which uses structural components of readily available materials, is inexpensive and easy to construct and provides for easy customization and replacement of structural components.

It is a further object of the present invention to provide a utility cart with all major components being interchangeable by the final user, thus allowing for replacement of only a part of the utility cart when only a part is damaged or broken.

It is a further object of the invention to provide a secure means for carrying a mop bucket with or without casters, on the utility cart itself, thus eliminating the cumbersome task of the carrying or pulling of the castered mop bucket, by the cleaning person.

It is a further object of the present invention to provide a utensil handle clamping member which will securely engage a handle of a mop or other utensil which may be situated at a variety of angles.

It is a further object of the present invention to provide a simplified adjustment assembly for adjusting the tray height in a utility car.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an elevational perspective view of the utility cart of the present invention;

FIG. 2 is a cross-sectional top view of the adjustable clamping assembly of the present invention;

FIG. 3 is a cross-sectional plan view partially broken away showing the compressed tubular construction of the present invention; and FIG. 4 is a detailed perspective view of the molded clip assembly of the present invention.

FIG. 5 is a top view of the modified mop handle engaging clip of the present invention.

FIG. 6 is a cross-sectional view of the modified mop handle engaging clip of FIG. 5 taken along line 6—6.

FIG. 7 is a perspective view of the adjustable hook means of the present invention.

DETAILED DESCRIPTION OF THE DRAWINGS

Figure 8:
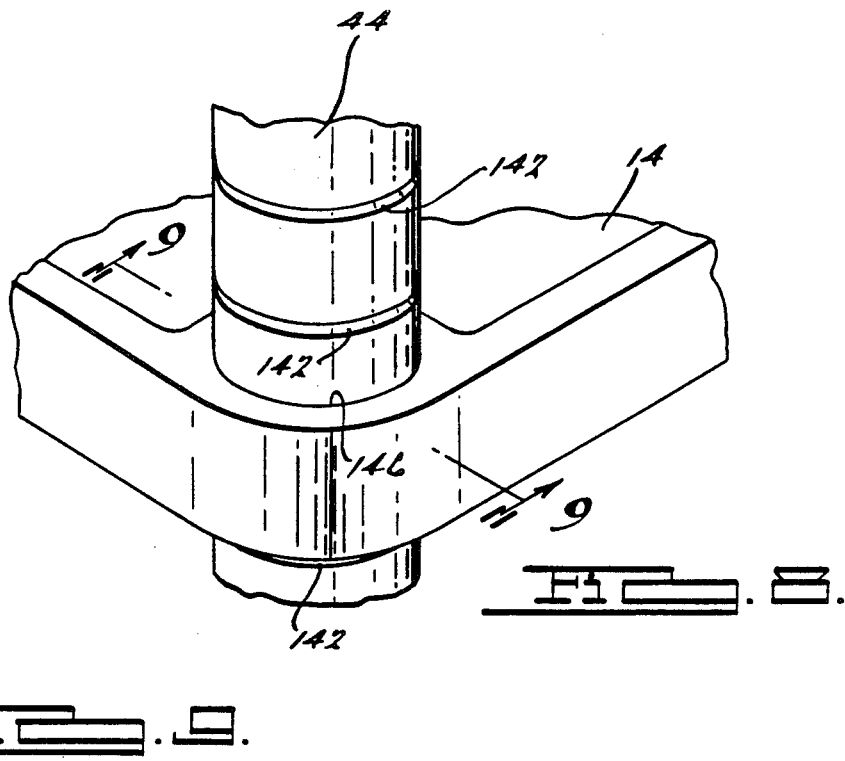
FIG. 8 is a perspective view of the adjustable positioning assembly of an alternate embodiment of the present invention.

A manually propelled utility cart of the present invention is generally shown at 10 in FIG. 1. As shown in FIG. 1, the utility cart 10 comprises a base means 12, an intermediate tray means 14, and a top tray means 16. The base means 12 includes wheeled movement means 18 which allows the utility cart to move in multiple horizontal directions along the floor surface.

The base means 12 includes a utility tray means 20, lower support post engaging means 22, and mop bucket carrying means 24. The mop bucket carrying means 24 includes means 26 for restraining movement of a castered mop bucket and levelly and securely carrying a mop bucket. The mop bucket carrying means 24 also includes a draining surface 28 and a drain and drain plug means 30. The draining surface means 28 along with the drain and drain plug means 30 allows the final user to selectively retain or drain any spillage from the mop bucket while the mop bucket is transported on the mop bucket carrying means 24.

The mop bucket carrying means 24 of a preferred embodiment of the present invention defines a level surface which has the dual function of either securely holding a normal mop bucket at level or will engage and restrain the movement of the casters of a castered mop bucket.

In a preferred embodiment of the present invention, the mop bucket carrying means 24 is a box-like portion having the draining surface 28 as the floor of the box-like portion. The draining surface tapers downward toward the drain and drain plug means 30. The drain surface includes four triangular shaped draining portions angled downward which form an inverse pyramidal-shaped surface. The mop bucket carrying means includes four pairs of rib members 26. Each pair of rib members extends diagonally inward from the corners of the box-like portion with the inner end of each rib member tapering into a wider girth such that the top surface 29 of the rib members 26 would be on the same plane. The top surface 29 provides a level supporting surface for a mop bucket.

Vertical structural support means 32 are provided in the present invention for supporting the intermediate tray means 14 and the top tray means 16 in a vertically upward position from the base means 12. The intermediate tray means 14 has adjustable positioning means generally shown at 34. The intermediate tray means 14 is also in slideable engagement with the vertical structural support means 32.

The top tray means 16 includes molded utensil holding means generally shown at 36. The top tray means 16 also includes handle means 38 which has integral trash bag retention means 40 integrally attached thereto. The upper tray means 16 also has upper support post engaging means 42 which are best shown in FIG. 3. The vertical structural support means 32 includes at least tubular structural member 44, which is engaged and secured in compression between the lower support post engagement means 22 and the upper support post engagement means 42. The compression is accomplished by way of compression means generally shown at 46 in FIG. 3.

In one embodiment of the invention the adjustable positioning means includes a releasable clamping means 48 for releasably clamping the intermediate tray means 14 in variable vertical positions between the utility tray means 20 and the top tray means 16.

The slideable engagement of the intermediate tray means 14 is accomplished by a through hole in the intermediate tray means 14 at the corners 50 of the intermediate tray means 14. The through hole has an arcuate vertical surface 52 which operates to engage the outside of the diameter of the tubular structural member 44. The clamping means includes an arcuate strap 56 which has a pair of companion bolted flanges 58. The pair of companion bolted flanges 58 are operatively attached to the arcuate vertical surface 52 and operate to securely clamp the tubular structural member 44 between the arcuate vertical surface 52 and arcuate strap 56.

Figure 9:
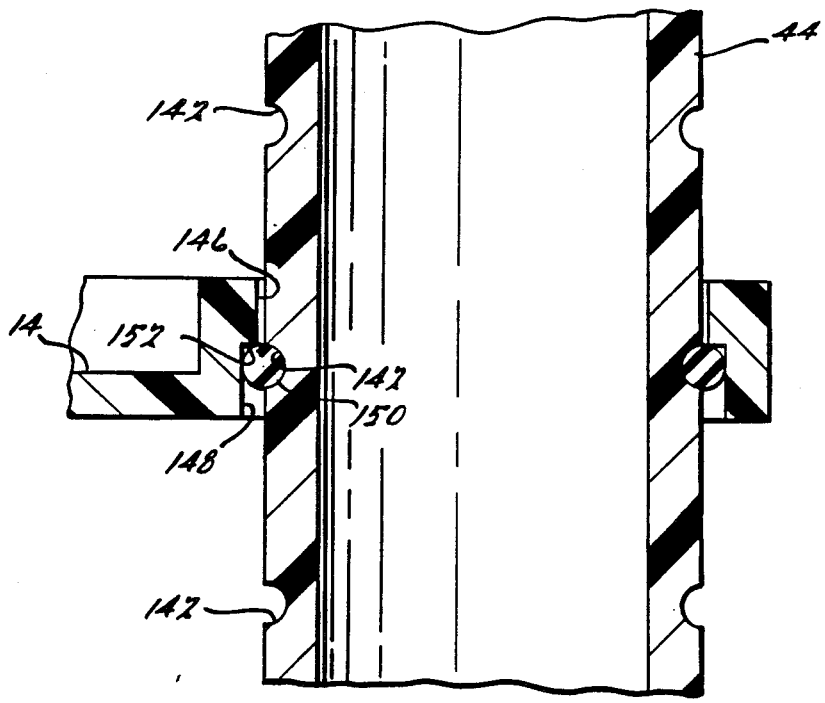
FIG. 9 is a detailed sectional view taken along line 9—9 of FIG. 8 showing the adjustable positioning assembly of the present invention.
Figure 10:
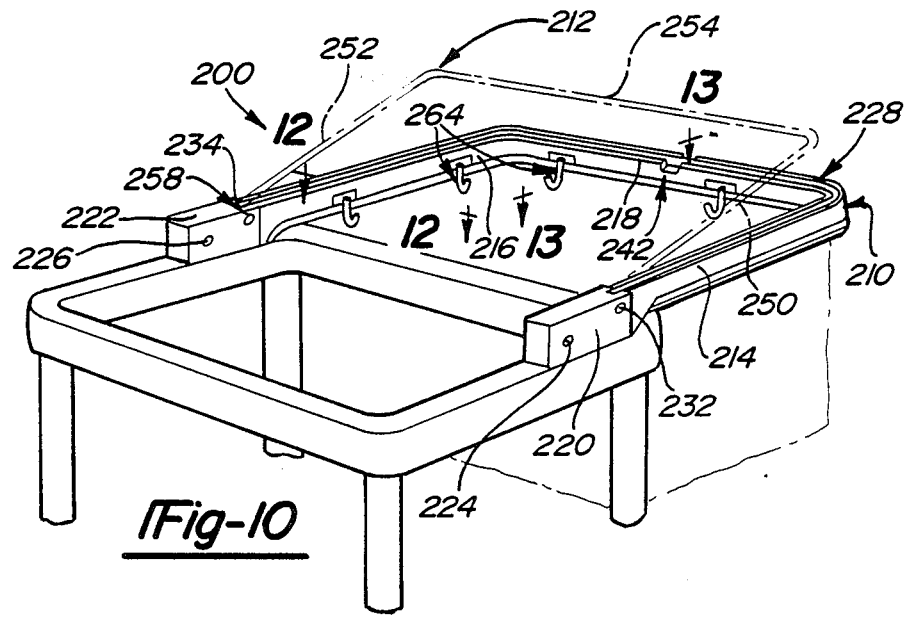
FIG. 10 is a partial perspective view of a utility cart in accordance with the present invention.

An alternate embodiment of the adjustable positioning means includes the adjustable positioning assembly as shown in FIGS. 8 and 9. As shown in FIGS. 8 and 9 the structural member 44 includes a series of peripheral grooves 142 along the vertical length of the structural member 44 the intermediate tray 14 or other movable member is provided with a throughbore means 144 which engages the outer periphery of the structural member 44 in a close sliding fit. A counterbore means 148 is provided and is in alignment with throughbore 144 to define a shoulder portion 152. Expandable ring means 150 is provided for releasable engagement into a groove 142 such that a portion of the ring means extends outward from the groove 142. The counterbore means 148 is designed to securely engage the ring means 150 around its periphery such that the ring means 150 cannot be displaced out of the groove 142 by the downward pressure from shoulder portion 152 on the ring means 150.

In operation the ring means 150 is placed in a selected groove 142 with the tray or other movable member positioned on the structural member 44 above the position of the ring means 150. The tray or movable member is then moved downward with the counterbore means securely engaging the outer part of ring 150 protruding from the groove 142 until shoulder portion 152 engages the top of the ring means 150. The tray or other movable member is securely held in the desired position and from further downward movement by the engagement of shoulder 152 with ring means 150.

In the preferred embodiment of the invention the structural member 44 is cylindrical in cross-section. However, other cross-sectional shapes could be used for structural member. For instance, an octagonal, triangular or square shape could be used to advantageously prevent rotation of a movable member around the structural member 44.

Preferably, groove 142 has a semi-circular cross-section and extends circumferentially around the structural member 44. The elastomeric ring means 150 is an 'O' ring type member made out of a resilient elastomer material and preferably has a circular cross-section. The 'O' ring has parts which extend outward from groove 142 when it is positioned in the groove 142. The cross-sectional diameter of the 'O' ring 150 is preferably about twice the radius of the semi-circular cross-section of groove 142.

The 'O' ring 150 must be expandable such that the ring 150 can be removed from the groove 142. The 'O' ring must also be resilient such that the ring will engage in another of the grooves 142 as necessary.

A plurality of grooves is provided on the structural member 44 to allow the final user a wide range of adjustments for the tray 14 or other movable member. In the preferred embodiment of the invention four of the structural members 44 with a plurality of grooves 142 are provided. The intermediate tray 14 has the bore means 146 and counterbore means 148 which define the shoulder portions 152 at each corner thereof. In this configuration the intermediate tray 14 is held securely in position at each of its four corners and can be repositioned simply by lifting the tray 14 off of the 'O' rings 142, moving the 'O' rings 150 to another desired groove and moving the tray downward such that the counterbore means 148 again engages the 'O' rings 150.

While the expandable ring means 142 and groove 150 have been shown as having a circular cross-section, the cross-sections could also be rectangular such that the expandable ring means is washer shaped and the groove 150 has an open rectangular cross-section. Other cross-sectional embodiments are also possible as long as the expandable ring means 150 engages the groove 142 and has parts protruding from the groove 142 which parts hold the expandable ring means 150 into the groove 142 and prevent disengagement of the expandable ring means from the groove 142. In addition, the ring means must withstand disengagement in the downward direction from loads on the tray which increase the downward pressure of the shoulder 152 on the ring means 150 to be used in the present invention.

While the adjustable positioning assembly is shown as used in the intermediate tray 14 it could also be used in any movable member wherein the adjustable positioning feature would be advantageous. Applications could include use in an adjustable hook for holding a cord, or use with a molded clamp member for holding a brush or the like without the scope of the present invention.

The compression means 46 of the present invention includes a threaded rod means 60. The threaded rod means 60 is internally placed in the axial opening 62 of the tubular structural member 44. The threaded rod means 60 also passes through holes 64 and 66 in the upper 42 and lower 22 support post engagement means and thereby defines a pair of threaded engaging ends 68 and 70. Nut means 72 and 74 are provided for operatively engaging the threaded rod means 60 and compressing the tubular support member 44 between the upper 42 and lower 22 support post engagement means.

In a preferred embodiment of the invention, the tubular support member includes a length of PVC tubing which is readily available as an off-the-shelf item in hardware stores and the like. In addition, other plastic materials could be used for the tubular support member of the present invention provided that the material has the requisite structural integrity and is impervious to cleaning chemicals and other solutions used by cleaning personnel.

The threaded rod means in the preferred embodiment of the present invention is of the type readily available at any hardware store. The threaded rod may be threaded along its entire length or in the alternative may as effectively only have threaded ends without departing from the present invention. While the preferred embodiment of the present invention uses steel rod, any other material which is structurally suitable could be used without departing from the present invention. In addition, the threaded rod means can be readily obtained in various lengths from any of a number of sources. Therefore, the present invention provides a customizable vertical height, accomplished by either cutting or obtaining shorter or longer lengths of PVC tubings and corresponding shorter or longer lengths of threaded rods.

The utensil holding means 36 of the present invention includes a plurality 76 of molded clips which are integrally molded with the top tray means 16. As shown in FIG. 4, each of the clips 36 includes a pair of resilient clamping arms 78 and 80. The clamping arms have a generally arcuate shape and define a narrow entry hole 82. In addition, the base means 12 of the present invention has a utensil handle retaining slot 82 located on the utility tray portion 20. In operation, the utensil holding means 36 operates in the following manner. A terminal end of a mop handle 84 is placed in the narrow entry hole retaining slot 82. The handle 84 engages the handle securing portion 86 by inward pressure against the resilient clamping arms 78 and 80 which cause arms 78 and 80 to move outward thereby opening the narrow entry hole 82. This allows the handle to move inward and thereby holds the handle in the handle securing portion 86 by inward pressure due to the resilient clamping arms 78 and 80.

The front wall 122 of the present invention also includes mop handle engaging clips, generally shown at 130, which hold a mop handle while the mop head is in the mop bucket for securely transporting the mop and mop bucket on the utility cart.

When a mop is resting in a mop bucket which is in place on the utility cart, the mop handle will be at an angle as it leans against wall 122 of top tray 16. To facilitate securing of the mop handle, the mop handle engaging clips of the present invention are modified to securely hold a tilted mop handle. More specifically, as illustrated in FIG. 6, the mop handle engaging clips 130 of the present invention include modified handle engaging surfaces 132, 132' and 134, 134' which are generally frusto-conical surfaces which abut to one another at ridge 136. The frusto-conical surfaces 132, 134 are skewed such that the back surfaces 132, 134 are at a greater angle from the vertical than frontal surfaces 132', 134'.

The configuration of mop handle engaging clips 130 is advantageous in providing secure engagement of a mop handle at a variety of angles. A mop handle protruding from a mop bucket may exit the mop bucket at an infinite variety of angles due to the variable positioning of the mop head in the mop bucket. Thus as shown in FIG. 6, the modified mop handle engagement clamps will facilitate the secure engagement of a mop handle because of engagement of the mop handle over a relatively large circumferential surface area even when the mop handle is at an angle to the clip. Thus, as shown in FIG. 6, mop handle positions 138 and 140 are shown to better illustrate engagement of a mop handle by the modified mop handle engagement clips. As an illustration, a mop handle in the position of 138, wherein the mop handle is leaning toward the top tray 16, is in aligned engagement with surface 132 of the clip 130 and moving circumferentially toward surface 132', the mop handle is engaged by ridge 136 and then by the lower portion of surface 134', thus providing for secured engagement of the mop handle.

As shown in the alternative, when the mop handle is angled away from the tray 16 as in position 140, the mop handle would be circumferentially engaged by aligned engagement with surface 132', and engagement with ridge 136. These examples are given as illustrations, the modified mop handle engagement clips of the present invention will securely hold a mop handle at a variety of angles, including those shown.

In a preferred embodiment of the invention four modified mop handle engagement clips are provided, preferably with two generally positioned at the center of the wall 122. In addition, the clips are integrally molded with wall 122 in a preferred embodiment of the invention.

In addition, vacuum wand extensions may be held in the utility cart of the present invention by molded clips 90 on the side opposed to the utensil handle molded clips and having the intermediate tray portion 14 which includes molded vacuum wand extension holders 88. A vacuum wand extension is placed over holder 88 and then is placed into a corresponding molded clip 90 on the top tray means 16.

An adjustable hook means 92 is provided in the present invention for convenient placement on one or several of the tubular structural members of the present invention. The adjustable hook means 92 includes a hook portion 93, a body portion 94, and a clamping portion 95. The hook 93 and body 94 portions may be a single integrally molded assembly or in the alternative, the hook portion may be attached separately to facilitate the use of interchangeable hook configurations. For instance, a hook configuration which is swivelable may be used in the present invention. The clamping portion of the present invention is operatively attached to the body portion and is of the same clamping means configuration illustrated in FIG. 2 and includes an arcuate strap 56 and a pair of companion bolted flanges 58. In the alternative the hook could include an adjustable positioning assembly as shown in FIGS. 8 and 9 and disclosed above.

In the configuration shown in FIG. 1, four of the adjustable hook means 92 are clamped on the front tubular support members which would facilitate the winding of an extension cord around the four hook members 92. However, as will be readily appreciated by those skilled in the art, the adjustable hook means may be placed on any of the tubular support members in many advantageous configurations and each adjustable hook means can be individually placed anywhere along the length of any of the tubular support members resulting in many customizable uses.

In the present invention, a novel rigid construction of a utility cart is provided in a utility cart having the features of the present invention. A utility cart which has a base member 12, a top tray member 16, and an intermediate tray 14 is provided. A rigid construction of the utility cart having these features comprises the following elements. A plurality of tubular support members 44 are provided which are held in compression between the base member 12 and the upper tray member 16 by threaded rod 60 and nut arrangement 68 and 70. In this configuration, the threaded rod passes through the upper tray member 16 and the base member 12 and through the center of the tubular support member 44. The nut arrangement 68 and 70 screwably places compression on the tubular support members 44 by engaging a bottom side 96 of the base member 12 and a top side 98 of the upper tray member 16, thereby operating to clamp the tubular support member 44 between base member 12 and the upper tray member 16.

In a preferred embodiment of the present invention, the plurality of tubular support members is further defined as being four lengths of PVC tubing which are disposed at the corners of the utility tray portion 20 of the base member and the corners of the upper tray member 16.

In a preferred embodiment of the invention, the base member 12 is provided which includes a mop bucket securing portion 24 with vertical walls 100, 102, 104 and 106, which define a first box-like portion. The mop bucket securing portion 24 includes caster curbs 26 for securing a mop bucket in nonmoving engagement while the mop bucket is being transported on the utility cart. As will be appreciated by one skilled in the art, the use of a mop bucket having casters on the bottom is common. The caster curbs 26 are situated as to provide secure means for stopping movement of a castered mop bucket and extend to provide a level surface 29 for a mop bucket without casters. Thus, the present invention provides a simple means for transporting a mop bucket with limited spilling of the bucket and without being encumbered by the necessity of the cleaning person having to pull the mop bucket behind him or her or carrying the mop bucket separately.

The draining surface 28 is provided on the mop bucket securing drain portion 24 for easy draining of any water which has been spilled from the mop bucket. Included in the draining surface is a drain and drain plug arrangement 30 for selectively retaining or emptying the water in the draining surface 28. The base member 12 also has a molded bumper 108 around the periphery of the base member 12 and provides for protection of furniture and other things which may be damaged by careless operation of the utility cart and further operates to protect the utility cart from undue damage.

The base means 12 also includes a lower utility tray portion 20 which is adjacent to and sharing a vertical wall 106 with the mop bucket portion 24. The utility tray portion 20 has vertical walls 106, 110, 112 and 114 which define a second box-like portion. The lower support member engagement means is located at each of the corners of the box-like portion of the lower utility tray portion 20. A terminal utensil handle retention portion 82 is also provided and has a second vertical wall 116 which is parallel to vertical sidewall 114 and defines an open slot for engaging the terminal end of a utensil handle.

The top tray member 16 has vertical walls 118, 120, 122 and 123 which define a box-like upper tray portion. The top member also includes upper support member engagement means 42 located at the corners of the box-like portion. A plurality of molded utensil clips 36 which are integrally formed within opposite sidewalls 120 and 124 of the top tray member 16 is provided. A plurality of modified mop handle engaging clips 130 which have a generally bent hour-glass cross-sectional shape formed of skewed opposing frusto-conical surfaces 132, 134, are provided for securely holding a mop handle which is disposed at an angle out of the mop bucket. Also included is a handle means 38 which defines a central opening 40 for placement of a trash bag in a bag open arrangement. Also included on the handle member are hooks 39 extending from the bottom of handle 38. The hooks are positioned to hang a sign from such as a "Caution, Wet Floor" sign generally used while the operator is mopping a floor.

Four tubular support members 32 preferably consisting of PVC tubing are provided which are compressibly engaged between the lower support member engagement portion 22 and the upper support member engagement portion 42 by compression rod 60 with threaded ends 68 and 70 which pass through the upper and lower 42, 22 support member engagement portions and engage the upper and lower support member engagement portions with a pair of end nuts 72 and 74. The releasable arcuate clamps include arcuate clamping strap 56 having a pair of companion bolted flanges 58 which are operatively attached to the intermediate tray 14 for tensioning the arcuate clamping strap 56 radially inwardly, which in turn clamps the tubular support member between the arcuate clamping strap 56 and the intermediate tray 52. The base means 12 also includes a pair of multidirectional front casters 122 and a pair of axially mounted rear wheels 124 for support and movement of the utility cart. The base means also includes rear wheel fenders 126 located at the side of the utility tray portion 20 which protect spray from the rear wheels 124. In addition, the intermediate tray includes a handle 128 attached to the side of the intermediate tray 14 which may be used in steering the utility cart.

In the alternative the intermediate tray may include a series of throughbores 146 having corresponding counterbores 148 which define shoulders 152, situated at the corners thereof. The support members 44 have a plurality of circumferential grooves 142 in which expandable ring member 150 are placed. The expandable ring members 150 are inserted in horizontally planar groove 142 of the four support members 44, with the tray 52 held vertically above the ring members. The tray is then lowered onto the rings with the respective counterbores engaging the outer periphery of the expandable ring member 150 and the shoulder 152 being retained from further downward movement by supporting engagement with the expandable ring members 150.

Also provided is at least one adjustably mounted hook member 92 which includes the same arcuate clamping arrangement disclosed above (FIG. 2). In the alternative the adjustable hook member could include the throughbore and counterbore assembly for adjustable positioning used in combination with the expandable ring as disclosed above (FIG. 8). Any number of these members can be used and positioned on any of the tubular support members of the present invention as required by the final user.

FIGS. 10—13 illustrate another embodiment of the present invention. The elements which are the same as those previously described will be designated with the same reference numeral.

A mechanism for removably retaining plastic bags or the like is illustrated coupled with the utility cart 10 and designated with the reference numeral 200. The mechanism 200 includes a first U-shaped member 210 and a second U-shaped member 212 to secure a plastic bag or the like to the first U-shaped member 210.

Figure 11:
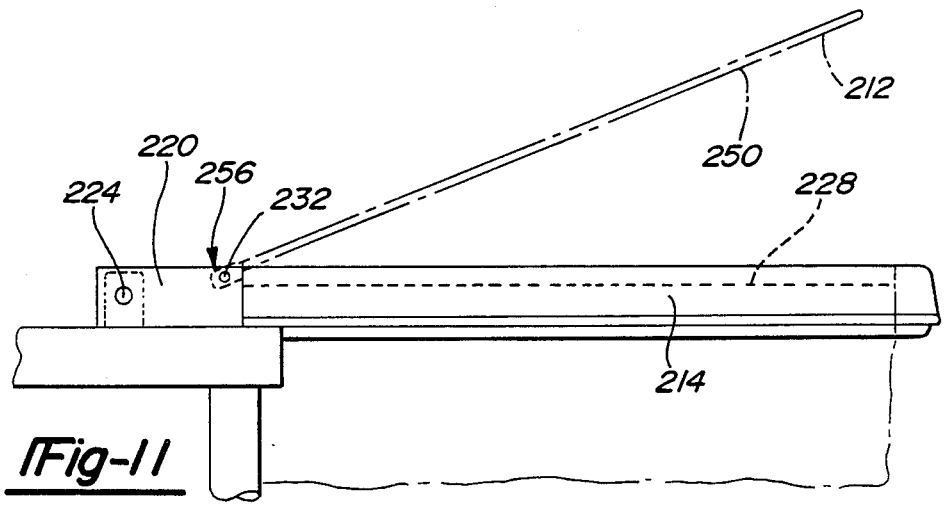
FIG. 11 is a side elevation view of FIG. 10.

The U-shaped member 210 includes a pair of legs 214 and 216 and a web 218 between the two legs 214 and 216. Both legs 214 and 216 include head 220 and 222 to secure the U-shaped member 210 to the top tray 16 of the utility cart 10. The heads 220 and 222 have pins 224 and 226 to secure the U-shaped member 210 to the tray 16. The tray 16 may be plain as seen in FIG. 11 or have the utensil holders as seen in FIG. 1.

Figure 12:
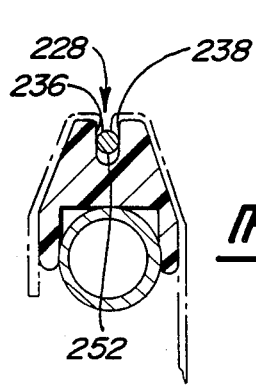
FIG. 12 is a transverse vertical cross-section view taken substantially upon the plane indicated by section line 12—12 of FIG. 10.
Figure 13:
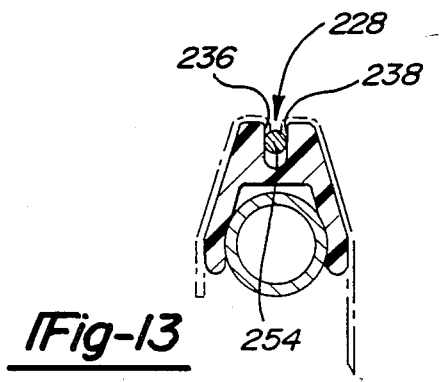
FIG. 13 is a transverse vertical cross-section view taken substantially upon the plane indicated by section line 13—13 of FIG. 10.

The U-shaped member 210 includes a channel 228 on its upper surface. The channel 228 receives the second U-shaped member 212 for locking a plastic bag (shown in phantom) or the like between the two members 210 and 212. The U-shaped member 210 includes pin members 232 and 234 to secure the second U-shaped member 212 to the first U-shaped member 210. The U-shaped member 210 has an overall frustrum shaped when viewed in cross-section as illustrated in FIGS. 12 and 13. The channel 228 is substantially U-shaped when viewed in cross-section with walls 236 and 238 narrowing to the opening of the U.

The U-shaped member 210 includes a slot 242 to enable removal of the second U-shaped member 212 from the channel 228 upon removal of the plastic bag or the like. Ordinarily, the U-shaped member 210 is formed from a molded plastic material being lightweight and having satisfactory strength characteristics. Also, the U-shaped member 210 includes hooks 260 for securing bags having eyelets or the like. The hooks 260 are spaced about the inner periphery of the U-shaped member.

The second U-shaped member 212 is formed from a hollow tubular member. The second U-shaped member 212 includes legs 250 and 252 and a webbed portion 254 between the two legs. The leg portions 250 and 252 include heads 256 and 258 with apertures (not shown) to enable the second U-shaped member 212 to be secured in channel 228 by pins 234 and 236. The pins 234 and 236 enable the second U-shaped member 212 to move from a horizontal position, locked in channel 228, to a vertical position enabling a plastic bag or the like to be positioned in and removed from the U-shaped member 210.

The utility cart of the present invention provides a lightweight efficient cart which is substantially made of lightweight plastic material in its preferred embodiment which is impervious to water and caustic chemicals used in the cleaning process. In addition, the major structural components are readily available PVC tubing and threaded rod providing for easy construction and versatility in the utility cart.

The invention has been described in an illustrative manner and it is to be understood that the terminology which has been used is intended to be that of description rather than of limitation.

Obviously, many modifications and variations of the present invention are possible in light of the above teachings. It is therefore to be understood that within the scope of the appended claims, the invention may be practiced otherwise than as specifically described.

What is claimed is:

1. A manually propelled utility cart comprising:
   base means positioned in substantially a horizontal plane, said base means including a utility tray means, lower support engaging means and a mop bucket carrying means, wheeled movement means coupled with said base means for multidirectional horizontal movement of said utility cart along a floor surface;
   top tray means positioned above said base means and including an upper support engaging means,
   vertical structural support means for supporting said top tray means vertically upward from said base means,
   said vertical structural support means including at least one hollow rod structural member engaged and secured in compression between said base means and said top tray means by a compression means and said hollow rod structural member engaged and secured in compression between said upper support engaging means and said lower support engaging means; and
   means for removably retaining a bag, said bag retaining means connected to said top tray means extending laterally therefrom, said means for removably retaining a bag including a first U-shaped member and second clamping member, said first U-shaped member positioned in a first plane and said second clamping member being movable from a first position wherein the bag is positioned on or removed from said first U-shaped member to a second position wherein said bag is secured to said first U-shaped member;

2. The manually propelled utility cart according to claim 1 wherein said first U-shaped member is in a horizontal plane, and said second clamping member adapted to move from said first position enabling the bag to be positioned on or removed from said first U-shaped member to said second position interconnected with said first U-shaped member for retaining the bag on said U-shaped member.

3. The manually propelled utility cart according to claim 2 wherein said first U-shaped member includes a channel for receiving said second clamping member.

4. The manually propelled utility cart according to claim 3 wherein said second clamping member being a U-shaped rod pivoted on said first U-shaped member and adapted to interconnect in said channel.

5. The manually propelled utility cart according to claim 5 said first U-shaped member including means for enabling access to manually release said U-shaped rod from said channel.

6. A manually propelled utility cart comprising:
   a base means positioned in substantially a horizontal plane and including a mop bucket carrying means, said mop bucket carrying means comprised of a rectangular box-like portion including a plurality of rib members on said base means extending diagonally inward from corners of said box-like portion and operating to securely hold casters of a castered mop bucket and for providing a level surface for securely holding a mop bucket without casters;
   wheeled movement means coupled with said base means for multidirectional horizontal movement of said utility cart along a floor surface;
   intermediate tray means positioned above said base means;
   top tray means positioned above said base means and said intermediate tray means;
   means for removably retaining a bag, said bag retaining means connected to said top tray means and extending laterally therefrom, said means for removably retaining a bag including a first U-shaped member and a second clamping member, said first U-shaped member positioned in a first plane and said second clamping member being movable from a first position wherein the bag is positioned on or removed from said first U-shaped member to a second position wherein said bag is secured to said first U-shaped member,
   vertical structural support means for supporting said intermediate tray means and said top tray means vertically upward from said base means, and said intermediate tray means having adjustable positioning means and being in slideable engagement with said vertical structural support means;
   said vertical structural support means including at least one hollow rod structural member engaged and secured in compression between said base means and said top tray means by a compression means;
   said adjustable positioning means including releasable clamping means for releasably clamping said intermediate tray means in variable vertical positions between said utility tray means and said top tray means.

* * * * *

UNITED STATES PATENT AND TRADEMARK OFFICE
CERTIFICATE OF CORRECTION

PATENT NO. : 4,869,518
DATED : September 26, 1989
INVENTOR(S) : Frank J. Breveglieri et al.

It is certified that error appears in the above-identified patent and that said Letters Patent is hereby corrected as shown below:

On the title page, item [75],
Inventors: "Breveglierij" should be --Breveglieri--;

Col. 9, Line 62, "are" should be
--is--;

Col. 10, Line 25, "head" should be
--heads--;

Col. 10, Line 38, "shaped" should be
--shape--;

Col. 11, Line 2, delete "are" after
"components" and insert --are-- after --available--;

Col. 11, Line 38, Claim 1,
    insert "and" after --means,-- (2nd occurrence);

Col. 11, Line 47, Claim 1,
    "member;" should be --member.--;

UNITED STATES PATENT AND TRADEMARK OFFICE
CERTIFICATE OF CORRECTION

PATENT NO. : 4,869,518
DATED : September 26, 1989
INVENTOR(S) : Frank J. Breveglieri et al.

It is certified that error appears in the above-identified patent and that said Letters Patent is hereby corrected as shown below:

Col. 11, Line 56, Claim 2,
  insert "first" after —said— (second occurrence);

Col. 12, Line 9, Claim 5,
"claim 5" should be —claim 4—.

Signed and Sealed this

Twenty-eighth Day of May, 1991

Attest:

HARRY F. MANBECK, JR.

Attesting Officer    Commissioner of Patents and Trademarks